United States Patent [19]

Meyerhoefer et al.

[11] Patent Number: 4,905,275
[45] Date of Patent: Feb. 27, 1990

[54] LAMINAR TYPE TELEPHONE PROTECTOR BLOCK AND INTERCONNECTABLE MODULAR ELEMENTS THEREFOR

[75] Inventors: Carl Meyerhoefer, Dix Hills; Helmuth Neuwirth, Garden City, both of N.Y.

[73] Assignee: Porta Systems Corp., Syosset, N.Y.

[21] Appl. No.: 306,084

[22] Filed: Feb. 6, 1989

[51] Int. Cl.⁴ ............................................. H04Q 1/14
[52] U.S. Cl. ................................... 379/327; 379/332; 361/119; 439/709
[58] Field of Search ............... 379/327, 328, 330, 331, 379/332, 412; 439/714, 715, 716, 709; 361/119, 120, 124, 129, 130, 56, 57, 118

[56] References Cited

U.S. PATENT DOCUMENTS

| 3,005,180 | 10/1961 | Dreher | 439/714 |
| 3,226,669 | 12/1965 | Lutz | 439/715 |
| 3,439,313 | 4/1969 | Fischer | 439/714 |
| 4,047,789 | 9/1977 | Glaesel | 439/714 |
| 4,313,147 | 1/1982 | Uchida et al. | 439/716 |
| 4,715,830 | 12/1987 | De Luca | 439/709 |
| 4,813,071 | 3/1989 | De Luca | 379/327 |

FOREIGN PATENT DOCUMENTS 1665371 10/1969 Fed. Rep. of Germany ...... 439/717

Primary Examiner—James L. Dwyer
Attorney, Agent, or Firm—Charles E. Temko

[57] ABSTRACT

A laminar type telephone protector block of quick clip type including grounding means incorporated into the individual laminae, and a novel protector module of gas tube type communicating with said grounding means.

11 Claims, 3 Drawing Sheets

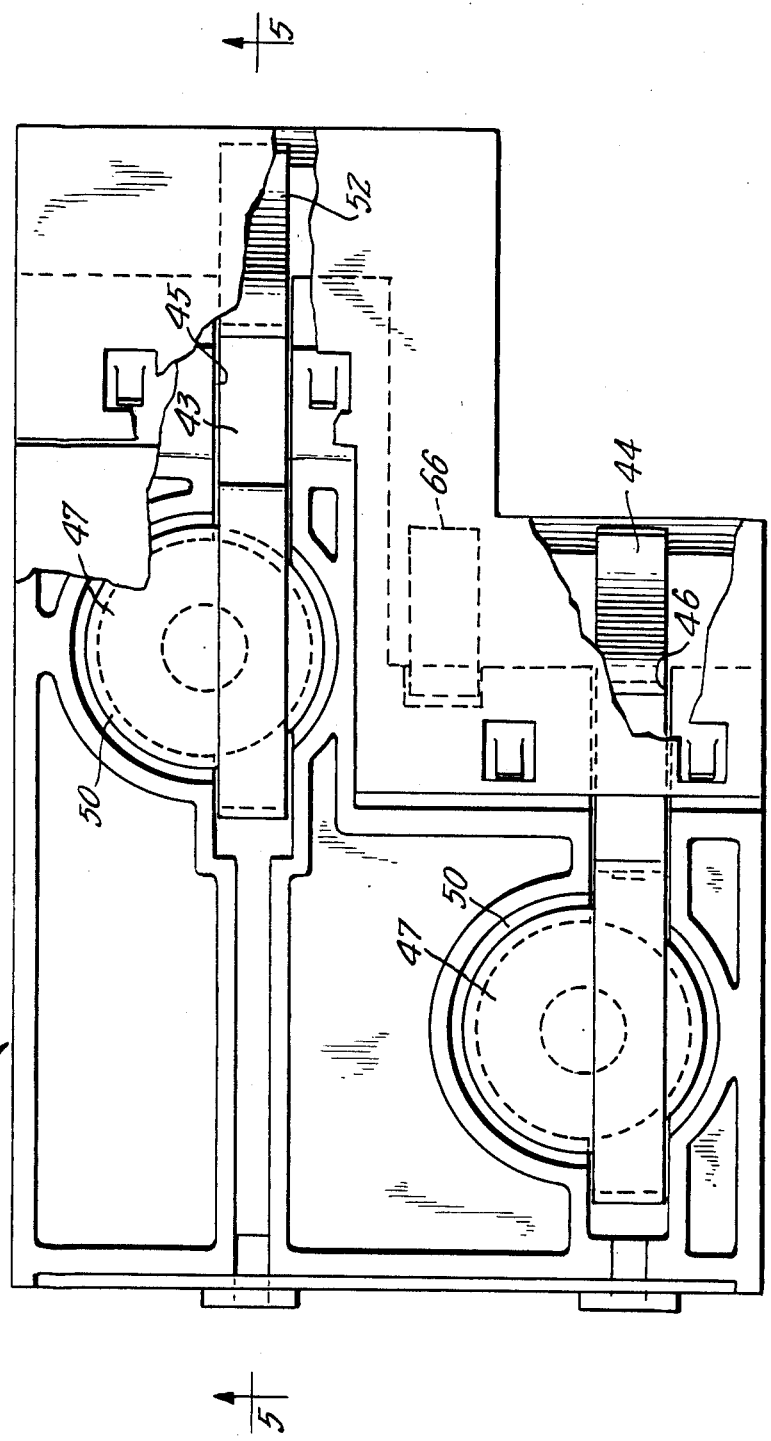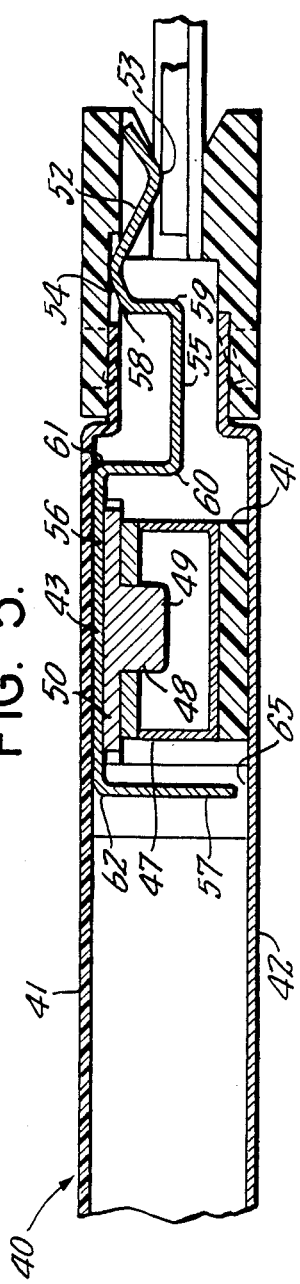

4,905,275

LAMINAR TYPE TELEPHONE PROTECTOR BLOCK AND INTERCONNECTABLE MODULAR ELEMENTS THEREFOR

RELATED APPLICATION

Reference is made to copending application Ser. No. 896,119, filed Aug. 13, 1986, now U.S. Pat. No. 4,813,071 in the name of Paul V. DeLuca, et al., and assigned to the same assignee as the instant application, which discloses and claims a related invention.

BACKGROUND OF THE INVENTION

This invention relates generally to the field of telephony, and more particularly to a laminar type subscriber circuit connector block having incorporated therein an improved grounding means and selectively engageable excess voltage and current protection means for individual subscriber circuits.

In the above-identified application, there is disclosed a connector block comprising a plurality of substantially identical laminar elements, each element mounting plural quick clip terminals which are axially oriented at approximately 45° with respect to the principal axis of the laminar element itself. The advantages of this type of block include high subscriber circuit density, and the ability to assemble blocks using plural laminae to accommodate a desired number of subscriber circuits. The laminae are held together in laminated condition by a series of threaded connectors which provide a potential source of grounding, but because of the compactness of the block, it has heretofore, not been possible to provide individual subscriber circuit protection, or any means for connecting such protection to a source of ground potential. Additionally, it has not been possible to readily access subscriber circuits for testing or denial of service without the provision of separate test fields or switches.

SUMMARY OF THE INVENTION

Briefly stated, the invention contemplates the provision of an improved laminar type telephone connector block in which the above-mentioned disadvantages have been substantially eliminated. To this end, the individual laminar elements include incorporated conductors which communicate with the above-mentioned threaded connectors integrating the block, at one end thereof, and at an opposite end thereof with a novel protector module element of planar configuration adapted to engage the projecting ends of adjacent quick clip terminals of an individual subscriber circuit. Depending upon the particular embodiment selected, the protector module includes two separate two element gas tubes, or a single composite three element gas tube of reduced axial thickness. As in the case of conventional cubically shaped modules, the protector modules may be replaced with other types of similarly configured modules for purposes of testing, special service, denial of service and the like. The modules include mating relatively flat housing elements, which, when assembled, have a total thickness under one-quarter of an inch. As is the case with conventional protector elements, provision is made for protection against both current and voltage overloads.

BRIEF DESCRIPTION OF THE DRAWINGS

In the drawings, to which reference will be made in the specification, similar reference characters have been employed to designate corresponding parts throughout the several views.

FIG. 4 is a top plan view of a protector module with an upper housing member or cover removed for purposes of clarity.

FIG. 5 is a sectional view thereof as seen from the plane 5—5 in FIG. 4, and showing interconnection with the block of FIG. 1.

DETAILED DESCRIPTION OF THE DISCLOSED EMBODIMENT

Figure 1:
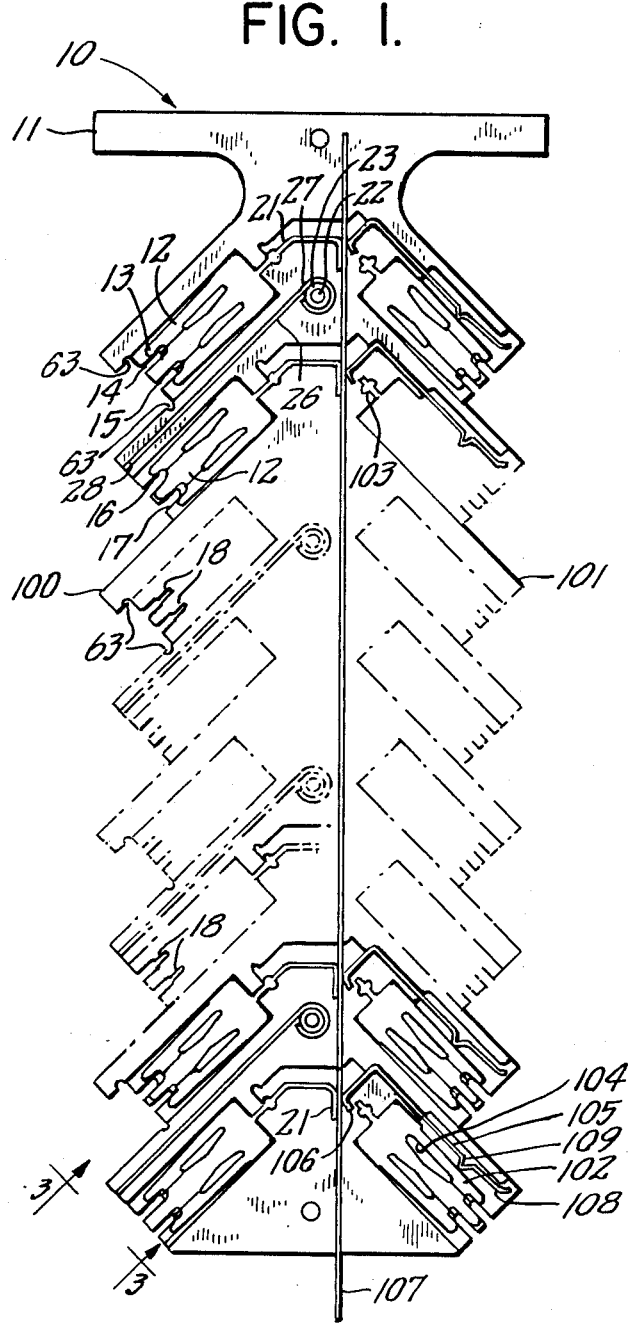
FIG. 1 is a fragmentary schematic view in elevation of a first embodiment of the invention.
Figure 2:
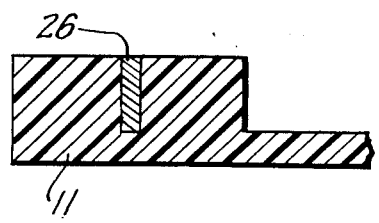
FIG. 2 is a fragmentary sectional view thereof as seen from the plane 2—2 in FIG. 1.

In accordance with the first embodiment of the invention, the device, generally indicated by reference character 10 (FIG. 1) comprises a plurality of individual laminar elements 11, the details of which are disclosed more fully in the above-identified copending application. Each laminar element 11 is provided with a plurality of quick clip terminals 12, the exposed ends 13 of which are provided with open ended slots 14 and 15 which overlie corresponding open ended slots 16 and 17 in the element 11. The slots 16 and 17 may optionally include portions of reduced thickness 18, the purpose of which is described and claimed in U.S. Pat. No. 4,715,830, said patent being assigned to the same assignee as the instant application.

The inner ends 20 of the terminals 12 include an elongated tail portion 21 which is used to interconnect with a similar tail portion on an opposite side of the element 11. The elements 11 are held together by threaded connecting members 22 enclosed in a metallic sleeves 23 which are connected to a source of ground potential, normally the frame (not shown) upon which the blocks are mounted.

Figure 3:
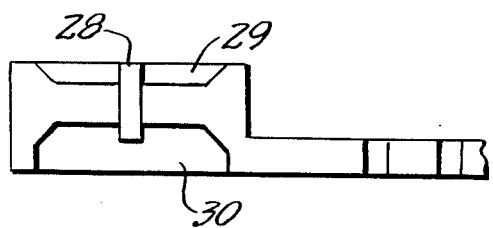
FIG. 3 is a fragmentary end elevational view thereof.

To provide interconnection with ground potential of the protector modules to be subsequently described, an elongated ground strip 26 is positioned with the element 11, and includes a first or inner end 27 which is curved about the sleeve 23, and a second or outer end 28 which projects into upper and lower recesses 29 and 30, (FIG. 3).

Referring to FIGS. 4 and 5 in the drawing, reference character 40 designates a two element protector module 40 comprising a lower plastic housing member 41 and an interconnectable upper metal cover member 42, the interconnected members 41 and 42 having a total thickness approximating one-quarter of an inch. Supported within the housing member 41 are tip and ring spring contacts 43 and 44, the contacts extending through planar bores 45 and 46 to communicate with a two element gas tube 47 through a fusible solder preform member 48. The member 48 is of button shaped configuration including a main body portion 49 and a planar flange portion 50.

The contacts 43 and 44 may be of known stamped bronze alloy, and include an outer V-shaped terminal 52 having a contact 53 at the apex thereof, a plurality of rectilinear segments 54, 55, 56 and 57, as well as a plurality of bent segments 58, 59, 60, 61 and 62. The upper cover member 42 made of electrically conductive material includes a terminal 66 which communicates with the end 28 of the ground strip 26. As shown in FIG. 5, the contacts 43 and 44 are so positioned under preloaded spring tension that should the fusible member 48 melt, the segment 57 will move downwardly to contact an inner surface of the metal cover 42 thereby shorting the electrodes to ground. Thus, during normal operation, steady contact will be maintained with both gas tube electrodes through the two metal solder preforms 48, and sustained current overloads will cause a melting of the fusible members 48 and permanent grounding of the module.

Figure 8:
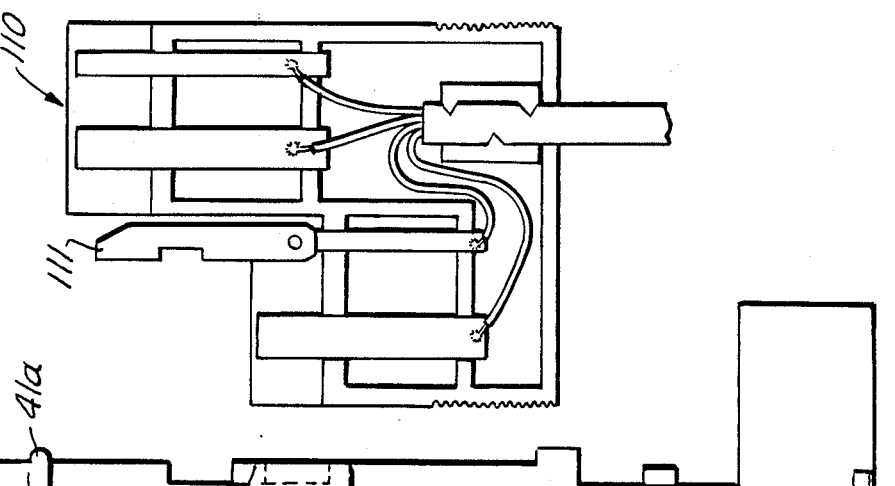
FIG. 8 is a sectional view showing a second embodiment of the invention.
Figure 6:
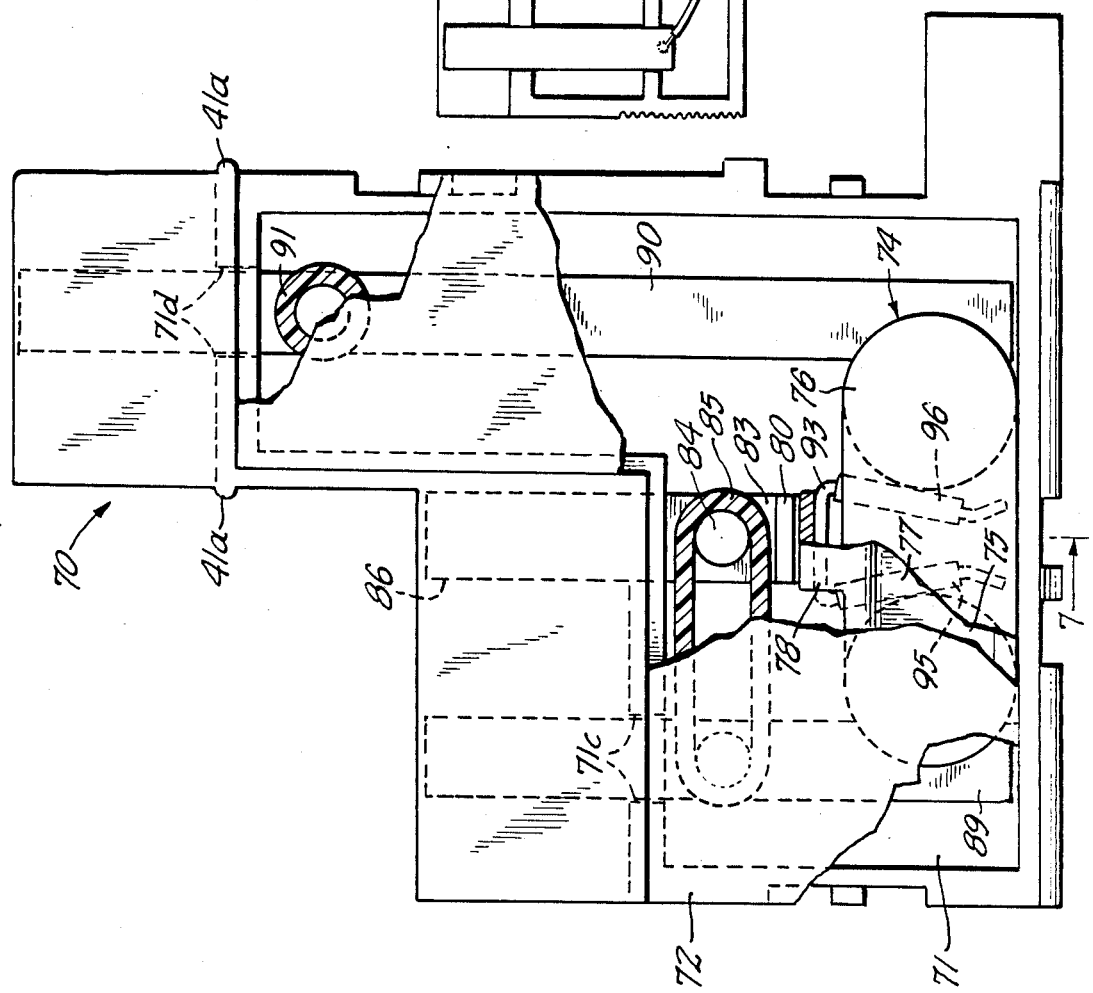
FIG. 6 is a top plan view of an alternate form of protector module with a top housing removed for purposes of clarity.
Figure 7:
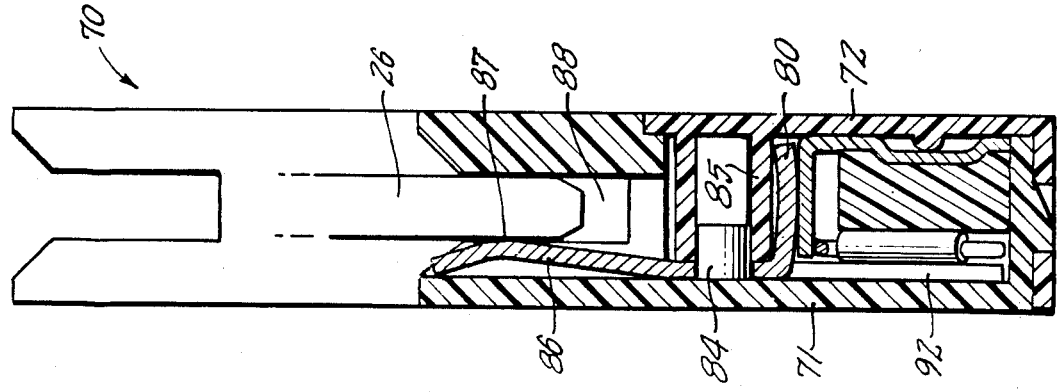
FIG. 7, is a sectional view as seen from the plane 7—7 in FIG. 6.

Referring to FIGS. 6, 7 and 8, there is illustrated another embodiment of a protector module, generally indicated by reference character 70, and characterized in the employment of a specialized three-element gas tube of very thin configuration. The module 70 includes first and second mating housing members 71 and 72 which enclose a three-element gas tube 74 comprising first and second two element tubes 75 and 76 and an interconnecting ground plate 77 having a lateral extension 78 communicating with a flat ground spring contact member 83. Ground communication is accomplished through a flexible bent segment 80 of contact 83. Contact 83 is located and positioned in housing member 71 with centering boss 84 and clamped and held by socket 85 on the cover 72. Contact 83 has an outer spring terminal 86 which engages the ground strip 26-28 at position 82 within socket 88.

Suspended within the housing member 71 are tip and ring spring contacts 89 and 90 the contacts extending through planar bores 71c and 71d to communicate with the first and second tubes 95 and 76. The housing member 71 includes projections 41a engageable with the recesses 63 during engagement of the module with a laminar element 11.

The contacts 89 and 90 as well as member 83 may be of known stamped bronze alloy, and include an outer "V"-shaped terminal 86 having a contact 87 at the apex thereof, a centering hole 91 and a bent segment 92 which provides spring loaded contact with the respective gas tubes 75-76.

A fail short means (FIG. 6) is provided by a "U"-shaped spring wire member 93 positioned between two electrodes of gas tubes 75-76 and grounding plate 77. Each leg of the wire has a plastic sleeve member 95 and 96 which serves as an electrical insulator and which will fuse and short to ground when the module is subjected to sustained current overloads.

Referring again to FIG. 1, it will be observed that the protector modules are mounted on one side 100 of the laminar element 14. On the opposite side 101 are insulation displacement contacts 102 which are generally similar to the contacts 12, in which the tail portions 103 are used only for locating purposes. Molded projections on the element 14 engage elongated slots 104 in the contacts and maintain them against lateral displacement. Supported within a corresponding recess is an elongated flexible contact 105 having an inner terminal 106 contacting a corresponding tail portion 21 after the withdrawal of an insulative cutover strip 107 of known type after the installation of the block has been completed. At the opposite end of the contact 105 is an elongated flexible portion 108 leading to an indented contact 109 which resiliently contacts a side edge of the contact 102. In the condition shown in FIG. 1, communication is thereby established between a contact 12 and a corresponding contact 102.

To provide a test facility, a test module 110 of configuration generally similar to the module 40 is adapted to be selectively engaged with the terminal 102 in a similar, plug-in, manner. The test module which is connected to test equipment (not shown) includes a terminal 111 which is the counterpart of the ground terminal on the module 40, and which, upon engagement with the portion 106 of the contact 105, moves it out of contact with the contact 102, thus introducing the test equipment in series with the subscriber circuit by means of a jack 112 and plug 113. This interconnection permits examination of both the subscriber side of the circuit and the telephone company side of the same circuit.

Where it is desired to suspend service to the subscriber line, a similar module (not shown) lacking interconnection to test equipment is employed to merely open the circuit in a similar manner.

It may thus be seen that we have invented highly novel and useful improvements in telephone protector modules suitable for use with laminar type connector blocks having exposed quick clip terminals projecting from each lamina. Using either known two-element gas tubes or a planar three-element gas tube assembly, the total thickness of the module may be maintained at approximately one-quarter of an inch, thereby ideally suiting it for use with individual laminar elements of the block of approximately the same thickness. In each case, a fusible element is provided so that momentary current surges may be accommodated by conduction of the gas tube components, and sustained current excesses may result in a permanent grounding with the melting of a fusible element, as in conventional cubically shaped modules. By means of a separately engageable test module, it is possible to test an individual subscriber circuit without the necessity of removing the corresponding protector module, and, where necessary, subscriber service can be suspended by the use of a similar module which serves merely to open the subscriber circuit at the block location.

We wish it to be understood that we do not consider the invention to be limited to the precise details of structure shown and set forth in this specification, for obvious modifications will occur to those skilled in the art to which the invention pertains.

We claim:

1. In combination, an improved laminar type telephone connector block and subscriber circuit protector module therefor; said connector block comprising a plurality of laminar elements in juxtaposed mutually parallel relation, and at least one elongated interconnecting means penetrating each of said laminar elements serving to maintain said laminar elements in integrated condition, said last-mentioned means providing interconnection with a source of ground potential; said laminar elements including a plurality of quick clip terminals having exposed ends thereon for the interconnection of circuit conductors accessible from side edges of said laminar elements; a plurality of integrally molded ground strips extending from said side edges of said laminar elements to contact said elongated interconnecting means; said protector module being of planar configuration corresponding in thickness to that of an individual laminar element and comprising mating housing and cover members, tip and ring contacts positioned within said housing member and contacting at one end thereof corresponding quick clip terminals on said block, a grounding contact positioned within said housing member and contacting said grounding strip at exposed mating ends thereof; and serially connected gas tube and fusible members communicating with said tip, ring and grounding contacts.

2. The combination set forth in claim 1, further characterized in said gas tube member comprising first and second two-element gas tubes disposed in coplanar relation.

3. The combination set forth in claim 1, further characterized in said gas tube members comprising first and second two-element gas tubes disposed in coplanar relation, a metallic housing enclosing said gas tubes, a fusible element disposed outwardly of said metallic housing, said grounding contact communicating with said fusible element.

4. The combination set forth in claim 1, further characterized in said laminar elements and protector module being in generally coplanar relation, and each having a thickness of approximately one-quarter inch.

5. The combination set forth in claim 1, further characterized in said laminar element supporting adjacent pairs of quick clip terminals in coplanar relation, the exposed ends of each of said pairs being positioned inwardly of one of first and second side edges of said laminar elements, said laminar elements defining a recess for the insertion and retention of a protector module.

6. The combination set forth in claim 5, further characterized in one of each of said adjacent pairs having an inner terminal of curved configuration extending toward the inner terminal of the other of said adjacent pairs, a flexible spring contact resiliently contacting said curved inner terminal substantially at one end thereof and having a contact portion thereon adjacent an opposite end thereof contacting said other of said adjacent pairs, said spring contact having an end disposed outwardly of said contact portion and selectively engageable with means for moving said contact portion out of contact with said other of said adjacent pairs.

7. The improvement set forth in claim 6, further comprising a module selectively engaging said other of said adjacent pairs, which engagement simultaneously engages said outwardly exposed end of said spring contact to open a related subscriber circuit.

8. The combination set forth in claim 6, further characterized in said module being a test module, wherein the opening of the circuit permits selective testing of said circuit on both the subscriber and central office sides thereof.

9. The combination set forth in claim 6, further characterized in said module including an open circuit, the engagement of which interrupts central office service to said subscriber circuit.

10. In an improved telephone subscriber circuit module for use with laminar type telephone connector blocks, the improvement comprising an outer housing and a cover therefor defining a hollow interior; tip, ring, and ground contacts extending outwardly of said housing and positioned to selectively engage corresponding contacts on said block; first and second gas tube elements interconnecting said tip and ring contacts to said ground contact to provide excess voltage surge protection; a length of spring wire of "U"-shaped configuration positioned between said first and second gas tube elements to be resiliently retained therebetween, said wire having a fusible insulative coating thereon normally preventing electrical communication between said gas tube elements, said fusible coating being fused upon the occurrence of a sustained current overload and connecting said gas tubes to said ground contact.

11. The combination set forth in claim 5, further characterized in said recess defining laterally extending portions, said protector module defining corresponding laterally extending projections selectively engaging said portions to provide detent means for retaining said module in engaged condition within said recess.

* * * * *